Jan. 9, 1968                A. R. DAVIS                3,363,175
METER WITH INCANDESCENT LAMP MEANS AND LIGHT SENSITIVE MEANS
FOR MEASURING RMS VOLTAGES

Filed June 16, 1964                           2 Sheets-Sheet 1

INVENTOR.
ARIEL R. DAVIS
BY
Frank E. Bruer
ATTORNEY

INVENTOR.
ARIEL R. DAVIS
BY Frank A. Bruer
ATTORNEY

United States Patent Office 3,363,175
Patented Jan. 9, 1968

3,363,175
METER WITH INCANDESCENT LAMP MEANS AND LIGHT SENSITIVE MEANS FOR MEASURING RMS VOLTAGES
Ariel R. Davis, 3476 Fleetwood Drive,
Salt Lake City, Utah 84109
Filed June 16, 1964, Ser. No. 375,520
3 Claims. (Cl. 324—96)

ABSTRACT OF THE DISCLOSURE

A voltage measuring meter having a standard incandescent lamp and a voltage variable incandescent lamp separately illuminating at different times a light responsive cell with a dial and needle measuring the received light. The light from the separate lamps passes through separate apertures controlled by adjustable shutters for setting the needle on the dial at a given deflection. The changes in voltage are measured in relation to the standard voltage.

---

This invention relates to measurement of variable voltages and particularly to the RMS measurement of a variable voltage.

In the measurement of voltages it is desirable to be able to secure in a simple manner the RMS value of any voltage so that the measuring device is independent of the wave shape. This has particular application to the measurement of the output of solid state controlled rectifiers whose wave shape at intermediate values has an extremely sharp leading edge and the wave shapes are often badly distorted by the components of the apparatus.

A particular application in connection with solid state controlled rectifiers is the measurement of the output of incandescent lamps illuminated by current controlled through silicon controlled rectifiers. It is now accepted as a stardard that the percentage of illumination emitted by a lamp should vary in proportion to the square of the linear dial settings of the light control member.

An object of this invention is to provide an inexpensive and accurate meter to measure the RMS value of output voltages.

Another object of the invention is to provide an inexpensive and accurate meter to measure the variation of illumination of a lamp in relation to the setting of the light control member.

Other and further objects and advantages will be apparent from the following description taken in connection with the drawings, in which FIG. 1 is a top view of the meter;

Figures 1, 2:
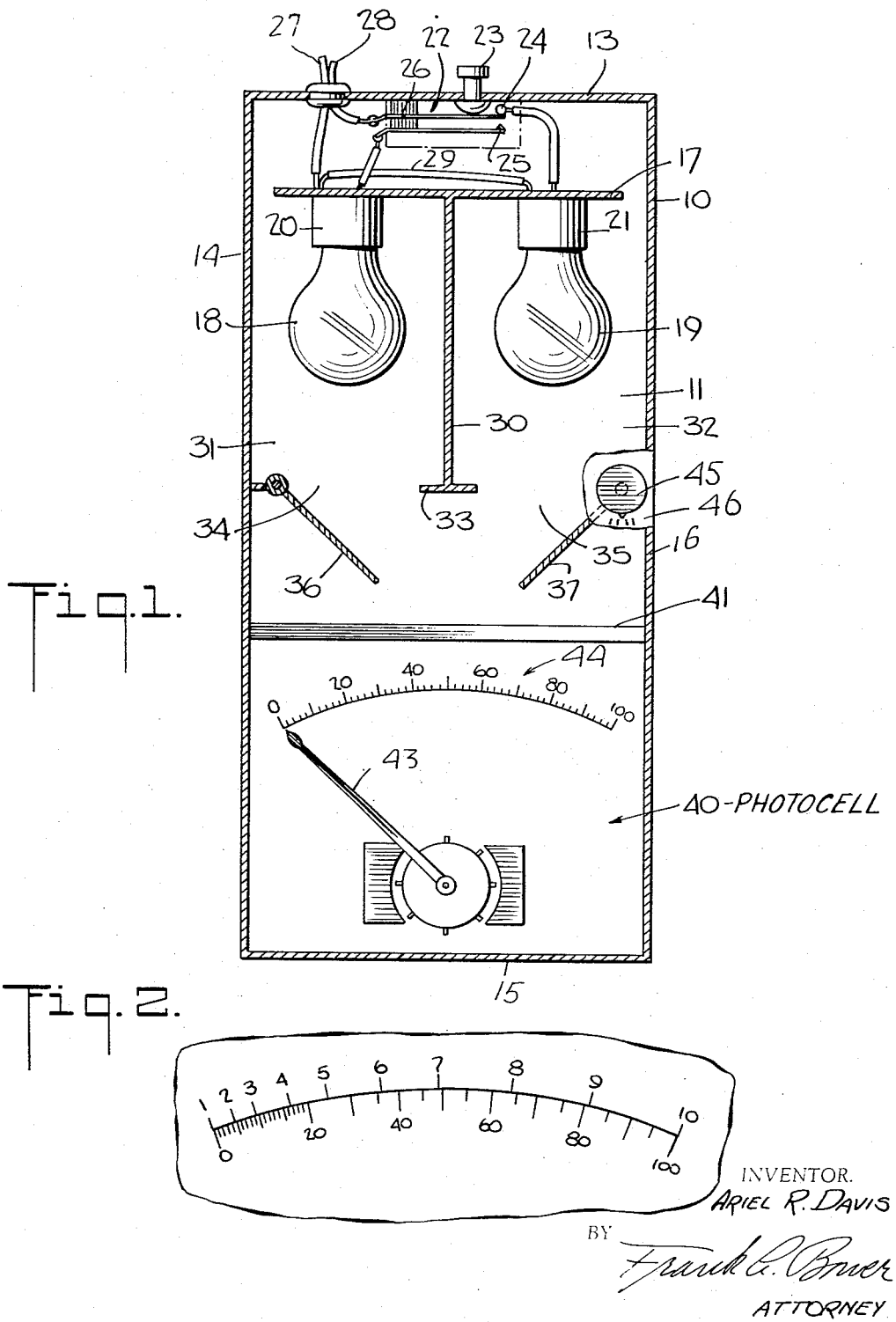
FIG. 2 illustrates relation of the dial settings to the percentage of illumination based on the square law principle.

Referring to FIG. 1, the meter comprises an opaque casing made of metal or any other suitable material. The casing 10 has a bottom wall 11, side walls 12, 13, 14 and 15 and a top wall 16 enclosing the components. The bottom wall 11 has a support 17 firmly mounted thereon and extending normal thereto. Incandescent lamps 18 and 19 are threaded in sockets 20 and 21 to firmly support the incandescent bulbs 18 and 19, respectively. A switch 22 is mounted on the end wall 13 and has a knob 23 extending therethrough for actuating the switch. The switch has fixed contacts 24 and 25 and a movable contact 26 engaged by the knob 23. The sockets 20 and 21 are connected to input terminal 27. The input lead 28 is connected to the movable contact 26. The internal lead 29 connects sockets 20 to lead 27. The other element of the socket 20 is connected to contact 25 and the other element of socket 21 is connected to contact 24. The movable element 26 can be shifted to connect with the lamp 18 or 19 for passage of current therethrough. Extending between the bottom 11 and cover 16 is an opaque metal barrier 30 forming two separate light compartments 31 and 32 for the lamps 18 and 19 respectively. A cross partition 33 is provided having openings 34 and 35. Shutters 36 and 37 are pivotally mounted to vary the amount of light passing through the openings 34 and 35. On the other side of the shutters 36 and 37 from the lamps 18 and 19 is a selenium type of light meter 40 having a selenium responsive light cell 41 facing the openings 34 and 35 and a needle 43 moving in proportion to the amount of light received. A linear scale 44 marked 0 to 100 is provided to measure the position of the needle 43 and the amount of light on the cell.

The light 18 functions as a standard and the meter is initially calibrated by adjusting the shutter 36 so that when 120 volts are applied to the input leads 27 and 28 the needle 43 will register at 100. In subsequent testing if the voltage of the leads 27 and 28 is below 120 volts, then the needle 43 will have a correspondingly reduced position on the scale so that the input voltage can be measured.

The bulb 19 is used to measure the variation of the output voltage in RMS value as the control element on a dimming system is varied. The maximum output voltage is measured by the lamp 18 and the shutter 37 is then adjusted so that the needle 43 is at the 100 position. A knob 45 is mounted on a shaft extending through the top wall or cover 16 so that the position of the shutter 37 may be readily changed. Since the lamp 19 is identical to lamp 18 and at 120 volts of full current produces a full scale deflection of the meter, the adjustment of the shutter 37 compensates for any deviation from 120 volts. A dial 46 may be provided at the knob 45 to indicate the line voltage. As the control is reduced, the readings can be taken of the output voltage to determine the relation of the RMS value of the output voltage and the control setting.

In FIG. 2 the linear dial is shown from 0 to 100 so in full scale deflection the needle 43 points to 100. The numbers 1 to 10 illustrate the position of the needle 43 for ten linearly spaced settings on the control dial. These settings are non-linearly spaced on the light meter scale and follow a square law relation to the settings of the control dial. Thus at full illumination position of the control knob or setting 10, the illumination reading on the scale is 100. However, for a midpoint position of the control knob which is at setting 5, the illumination is 25. This square law relation is the desired relation between the illumination emitted by the lamps and the control knob. The reason for this is that the human eye is more sensitive to changes of illumination at the lower intensities than at the higher intensities since the iris of the eye is larger at the lower intensities than at the higher intensities. In the present stage light equipment the attaining of this relation is rather difficult and the means of testing the light output of a system in relation to the control knob settings is rather complicated. The foregoing meter provides a simple measurement of the illumination performance in relation to control knob setting by attaching the meter to the output of the dimmer unit and varying the control knob in uniform increments and taking the corresponding readings on the meter. With the control knob settings indicated on the dial of the meter a simple means of illustrating the deviation of the light output for a given control knob setting is attained.

Figure 3:
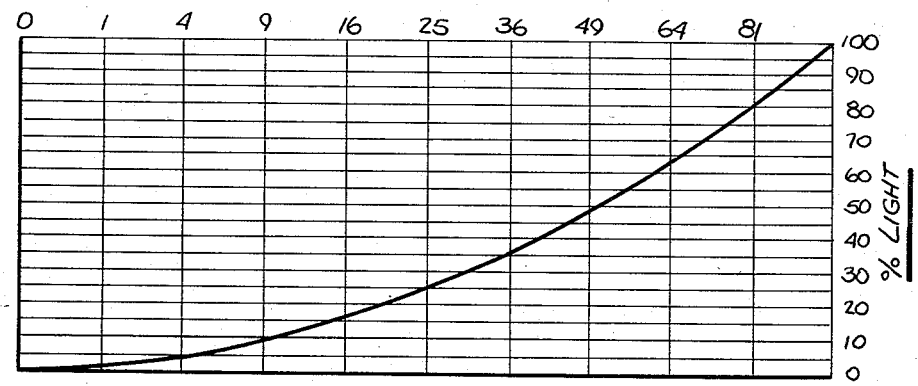
FIGS. 3, 4 and 5 are diagrams illustrating relationships of dial settings to illumination in percent of maximum light output.
Figure 4:
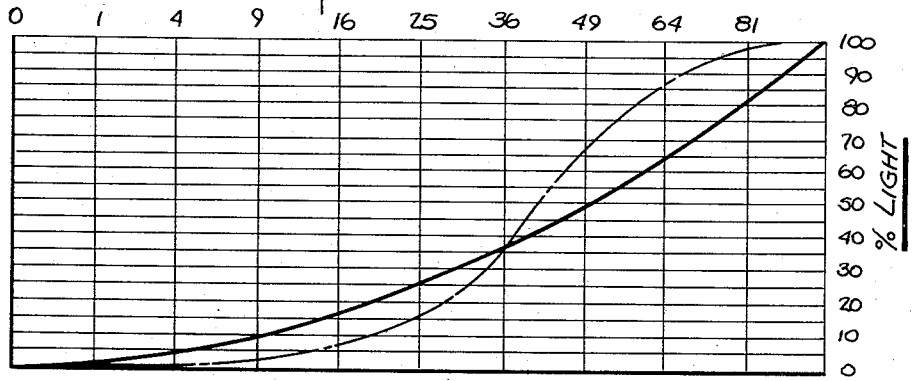
Figure 5:
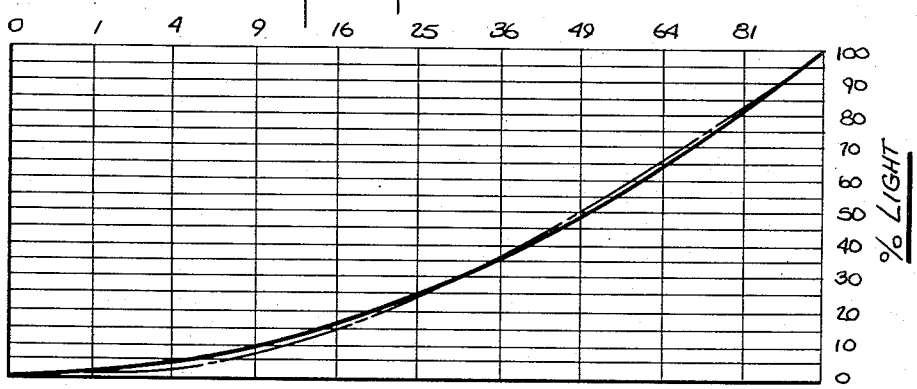

In FIG. 3 the standard square law curve A is illustrated. In FIG. 4 the square law curve is again illustrated and line B illustrates the curve of an uncorrected or poorly corrected dimmer unit. FIG. 5 illustrates the square law curve and a curve C which has been properly corrected by feedback circuits. The meter is simple in construction and is readily attached to a dimmer unit to quickly determine by physical observance of the movement of the needle 43 whether a given dimmer unit is meeting the requirements of a square law relation between the control knob and the illumination.

The invention is set forth in the appended claims.

I claim:

1. An RMS voltage measuring meter comprising a meter having a light sensitive cell and deflectable means actuated by said cell for measuring the light output of an incandescent lamp, two incandescent lamps positioned to activate said cell on emission of light therefrom, means for connecting said lamps to a voltage source including switch means for separately connecting either of said lamps thereto, an opaque partition between the lamps and a second partition between said lamps and said cell forming two separate compartments for said lamps, said second partition having openings for passage of light from said compartments to said cell, two shutters independently and hingedly mounted on said second partition for adjusting the amount of light passing through a respective opening, one of said shutters positioned to produce a full scale movement of said deflectable means at a given illumination of the respective lamp at a maximum voltage and said other shutter having means for adjusting said other shutter to vary the opening for producing a full scale deflection over a range of applied voltages.

2. An RMS voltage variation measuring meter comprising an enclosing casing, a meter having a light sensitive cell mounted in said casing and having a dial and movable needle to indicate the amount of light impinging on the cell, two incandescent lamps mounted in said casing and means for connecting said lamps to a voltage source including switching means for separately connecting said lamps thereto, partitions isolating said lamps in separate compartments and apertures in said partitions for separately passing light from a respective compartment to impinge on said cell, adjustably mounted shutter means for varying the amount of light passing through said apertures, one of said shutter means being set to provide a full scale deflection of said movable needle at a given applied voltage and means exterior to the casing connected to said other shutter means to adjust said other shutter means to produce a full deflection of said needle over a range of applied voltages so that the variation of an output voltage in relation to a control member may be readily measured.

3. An RMS voltage measuring meter comprising an enclosing casing, a meter having a light sensitive cell mounted in said casing and having deflectable means actuated by said cell for measuring the light output of an incandescent lamp, two incandescent lamps mounted in said casing and means for connecting said lamps to a voltage source and including switch means for separately connecting said lamps thereto, said casing having partition means with two separate apertures for separately passing light from a respective lamp to impinge on said cell, two shutter means independently and adjustably mounted on said casing at a respective aperture for varying the amount of light passing through said apertures, one of said shutter means being settable in relation to a respective aperture to provide a full scale deflection of said deflectable means at a given applied voltage and said other shutter means having means for adjusting said other shutter means in relation to said respective aperture to set the amount of light for a full scale deflection so that the variation of an output voltage may be readily measured in relation to a given applied voltage.

References Cited

UNITED STATES PATENTS 2,081,839   5/1937   Rankin _____ 324—96

RUDOLPH V. ROLINEC, *Primary Examiner.*

E. F. KARLSEN, *Assistant Examiner.*